July 3, 1934.                C. F. HIGGINS                1,965,118
                        CHANGEABLE EXHIBITOR
                  Filed Aug. 27, 1930          3 Sheets-Sheet 1
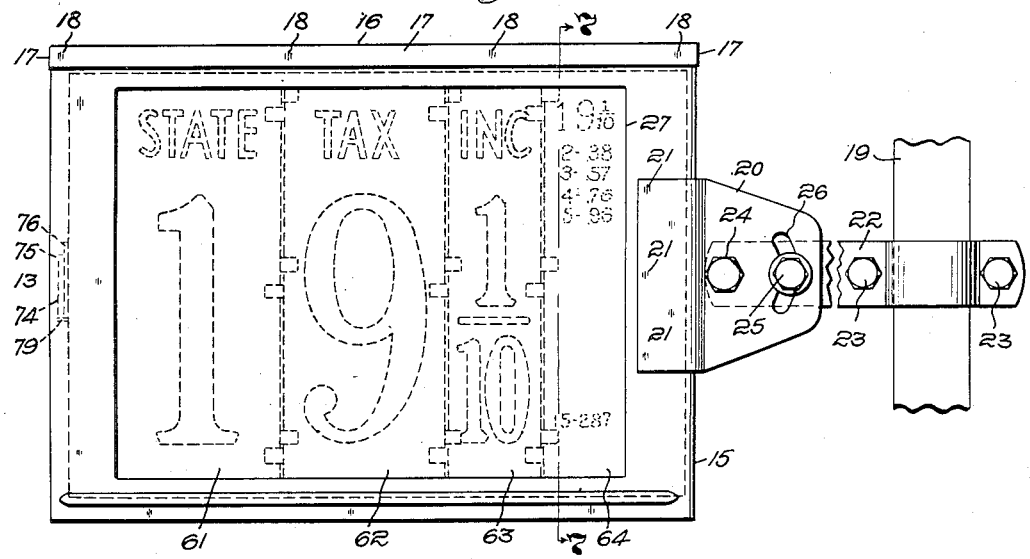
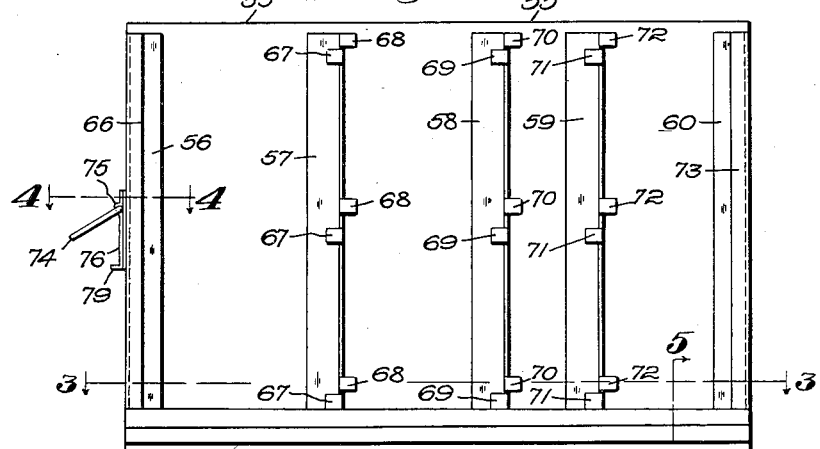
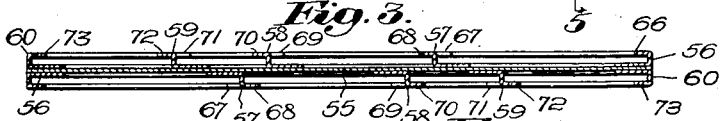
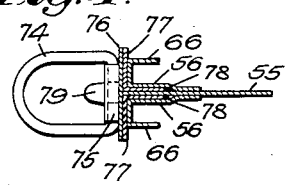
Inventor:
Clark F. Higgins,
by Emery, Booth, Varney & Townsend
Attys.

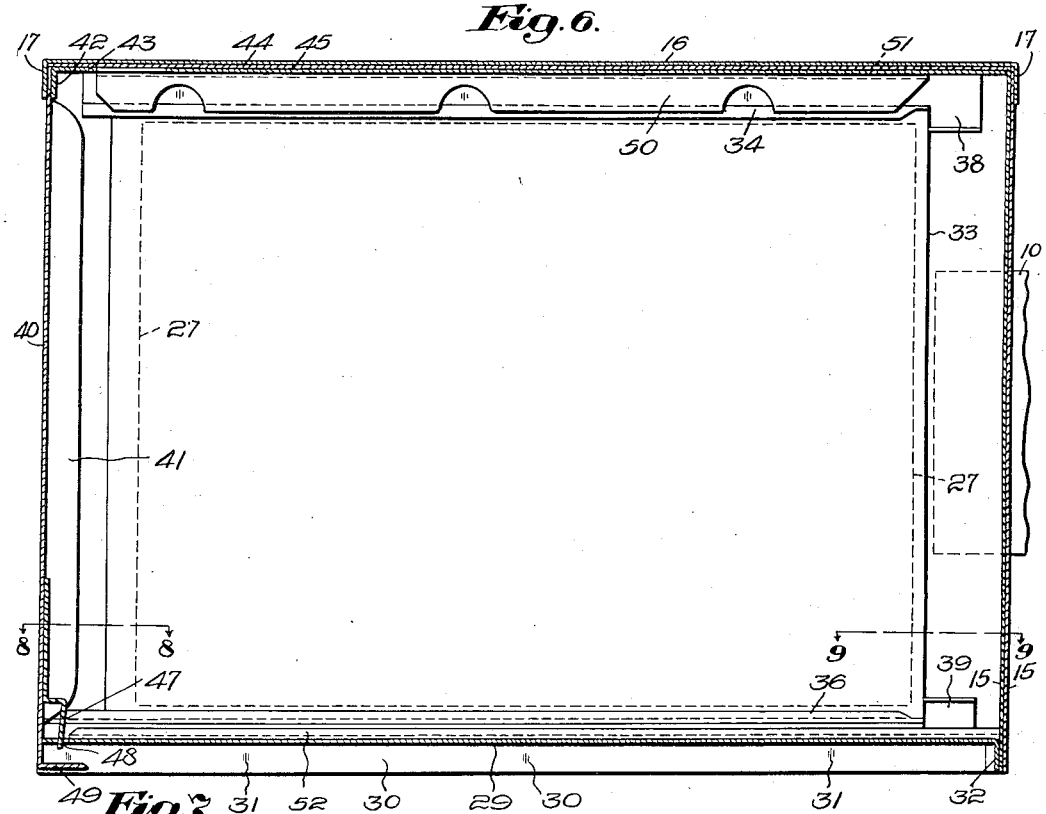

July 3, 1934.  C. F. HIGGINS  1,965,118
CHANGEABLE EXHIBITOR
Filed Aug. 27, 1930  3 Sheets-Sheet 3
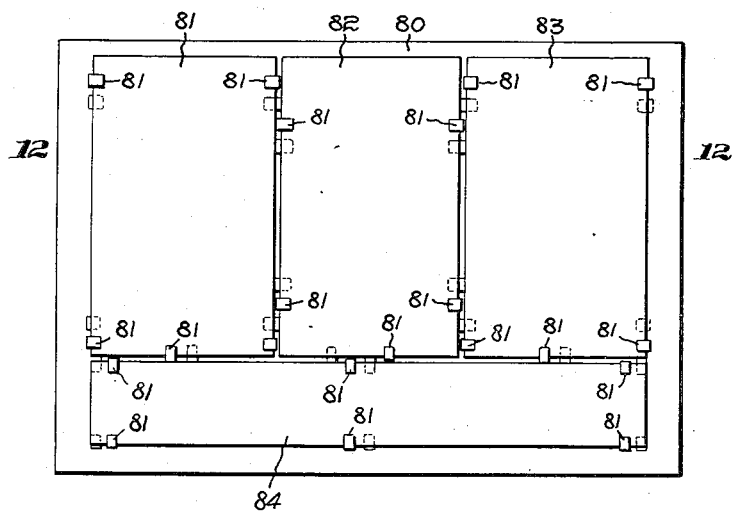
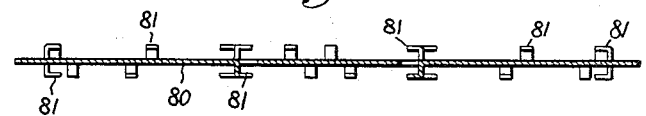
Inventor:
Clark F. Higgins
by Emery, Booth, Varney & Townsend
Attys.

Patented July 3, 1934

1,965,118

UNITED STATES PATENT OFFICE 1,965,118

CHANGEABLE EXHIBITOR

Clark F. Higgins, Melrose Highlands, Mass.

Application August 27, 1930, Serial No. 478,118

7 Claims. (Cl. 40—64)

This invention relates to changeable exhibitors of the class in which interchangeable plates are presented to view through one or more apertures in a housing. While the invention is susceptible of use for various purposes, it is particularly intended for use as a sign to be employed at places where gasoline is sold, to show the price per gallon, and also if desired the price computation for various amounts of gasoline in excess of one gallon.

The invention will best be understood by reference to the following description, when taken in connection with the accompanying drawings of one specific embodiment thereof, while its scope will be pointed out more particularly in the appended claims.

In the drawings:

Fig. 1 is an elevation of a changeable exhibitor embodying the invention;

Fig. 2 is an elevation of the plate-holder;

Fig. 3 is a sectional view on line 3—3 of Fig. 2;

Fig. 4 is a sectional view at an enlarged scale on line 4—4 of Fig. 2;

Fig. 5 is a sectional view at an enlarged scale on line 5—5 of Fig. 2;

Fig. 6 is a vertical, sectional view of the housing at an enlarged scale, looking in the same direction as Fig. 1;

Fig. 7 is a sectional view at an enlarged scale on line 7—7 of Fig. 1;

Fig. 8 is a sectional view on line 8—8 of Fig. 6;

Fig. 9 is a sectional view on line 9—9 of Fig. 6;

Fig. 10 is a perspective view of a closure for the opening through which the plate carrier is withdrawn from and replaced in the housing;

Fig. 11 is an elevation of a modification of the plate carrier; and

Fig. 12 is a horizontal sectional view of the carrier shown in Fig. 11.

Referring to the drawings, and to the embodiment of the invention which is illustrated therein, there is shown an exhibitor comprising a housing 13, conveniently made of sheet metal, and herein comprising complementary sections 14 (see Figs. 8 and 9), each of which is provided with a flange 15, best shown in Fig. 9, overlapping the other and conveniently secured together as by spot-welding at several points. One edge of the housing, herein the top, is permanently closed by a cap 16 (see Fig. 1), provided on all sides with a flange or flanges 17, conveniently secured to the sections 14, by spot-welding, as at the points 18.

The housing may be mounted on an appropriate support, herein an upright post 19 (see Fig. 1), as by use of a pair of brackets 20, conveniently secured to the housing, as by spot-welding at the points 21, and these brackets receive between them a pair of duplicate clamping members 22, which embrace the post 19, and are clamped thereto, as by bolts 23. The clamping members 20 are pivoted to the brackets 22, as by a pivotal bolt 24, extending through both of the brackets 20, and through both of the clamping members 22. The housing may be adjusted about the axis of the pivotal bolt 24 to place the housing level, and may be clamped in its adjusted position by a clamping bolt 25, which extends through both brackets and through both clamping members, each of the brackets 20 being provided with a slot 26 concentric with the pivotal bolt 24.

The housing is provided with one or more apertures 27, through which the plates, cards or other matter to be displayed may be viewed. In the present example, there are two such apertures, on opposite sides of the housing, and the margins of these apertures are provided with inwardly-directed flanges 28 (see Figs. 8 and 9).

Herein, the housing is closed at the bottom, by a channel member 29 (see Figs. 6 and 7) having downwardly-directed flanges 30, suitably secured in place as by spot-welding at the points 31 (see Fig. 6). As will presently appear, these flanges are indirectly secured to the complementary housing sections 14, because there are other parts later to be described which intervene between the flanges and the housing sections. At one end, the channel member is provided with a downwardly-directed flange 32, shown at the lower right-hand portion of Fig. 6, also secured in place by spot-welding to the overlapping flanges 15.

The two opposite apertures 27 for the display of the interchangeable plates presently to be described are covered by transparent plates, such as sheets of glass 33 (see Fig. 7), whose dimensions are larger than the apertures. The upper edges of the glass plates are received in rabbets presented by bars 34, having flanges 35 suitably secured as by spot-welding to the housing sections 14, and the lower edges of the glass plates are similarly received in rabbets presented by bars 36, having flanges 37, secured as by spot-welding to the complementary housing sections 14. The glass plates are introduced into their places by sliding them from one end (herein, the left-hand end as viewed in Fig. 6). Inward movement is conveniently limited by upper stops 38 formed on the bars 34, respectively, and bent to occupy the planes of the glass plates, as shown in Fig. 7. Similarly, the bars 36 at the bottom are provided with stops 39.

One end of the casing (herein the left-hand end as viewed in Fig. 6) has an entrance for the introduction of the glass plates, and for the introduction of the interchangeable plates or cards which are to be displayed. This entrance is normally closed by a closure 40, which forms a removable end wall for the housing, and is received within the entrance. As shown in Fig. 10, this closure is provided with flanges 41, which, as shown in Fig. 8, are received between the complementary housing sections 14. The closure is conveniently held in place at the top by being received between the flange 17 on the cap 16 and a depending flange 42 presented by a short bar 43, which is spot-welded in place. Herein, this bar is not directly secured to the cap, but the latter is reinforced by two strips 44 and 45, one of which at one end is received between the bar 43 and the inner, lower face of the cap while the other, as shown, terminates short of the bar 43. It may here be mentioned that the sides of the housing adjacent the entrance are reinforced by strips 46 (see Fig. 8), secured as by spot-welding to the housing sections 14.

Referring again to Fig. 6, the closure 40 is conveniently secured in place at the bottom by providing the same with a downwardly-directed tongue 47, herein presented by a plate secured thereto as by spot-welding, and having its lower end normally occupying a slot 48 in the channel member 29. The closure can be removed by first sliding the same in an upward direction to withdraw the tongue 47 from the slot 48, after which the closure may be swung outwardly at its lower end and then withdrawn from its place. This can be accomplished conveniently by providing the closure at its lower end with an inwardly-directed tongue 49, by means of which the closure may be manipulated.

To guide the plate holder presently to be described, the housing is provided with a pair of upper guides 50, presented by angle bars 51 (see the upper portion of Fig. 7), and similar lower guides 52, presented by angle bars 53, both pairs of bars being suitably secured in place, as by spot-welding. The entrances to these guides are flared as at 54 (see Fig. 8), to facilitate the entrance of the plate-holder now to be described, reference being had to Fig. 2.

The plate-holder comprises a sheet metal plate 55, disposed in a vertical plane, and its upper and lower edges are received in the upper and lower guides just described. On each face of this plate, there are several pockets to receive the plates which are to be displayed. As shown, these guides are presented by several vertical bars 56, 57, 58, 59 and 60, one set on each side of the central plate, and one set being disposed reversely with relation to the other side. The spacing between the guides is made to correspond with the width of plates 61, 62, 63 and 64. Each of the pockets contains several interchangeable plates, placed one behind another (see Fig. 7), and each plate bears the desired characters, such as numerals (see Fig. 1), to constitute a changeable price sign. The lower edges of the plates are suitably supported, as by providing channel pieces 65 (see Fig. 5), appropriately secured as by spot-welding to opposite sides, respectively, of the central plate 55. The guide 56 (see Fig. 2) is provided with a continuous, vertical flange 66. The guide 57 is provided with two oppositely-directed sets of tabs 67 and 68, the guide 58 is provided with similar sets of tabs 69 and 70, the guide 59 is provided with tabs 71 and 72, and the guide 60 is provided with a continuous, vertical flange 73. All of these flanges and tabs are so arranged as to keep the plates in place between the vertical walls of the guides.

To facilitate the withdrawal and replacement of the plate-holder, the latter is provided with an appropriate handle 74, which, as shown, is pivoted at 75 to a plate 76, suitably secured as by welding the same to vertical angle bars 77 (see Fig. 4), each of which has a flange 78 disposed between the central plate 55 and the adjacent bar 56, and appropriately secured in place as by spot-welding. As shown, the plate 76 is secured in place by a short, horizontal detent 79, to hold the handle in a vertical position, as shown in Fig. 1, when the plate holder is in place in the housing.

Figs. 9 and 10 show a slightly modified plate holder, comprising a central plate 80, which is punched to form numerous tabs 81, which are struck up to provide pockets for several plates 81, 82, 83 and 84.

When the plates are to be rearranged to change the price shown by the sign, the removable closure 40, shown in Fig. 6, is removed in the manner already described, the handle 74, shown in Figs. 1 and 2 is then grasped and swung out into a generally horizontal position, and the plate-holder is then withdrawn from the housing toward the left, as viewed in Fig. 1, after which the plates may be removed from the plate holder and rearranged at will. The plate holder is then reintroduced into the housing, by reversal of the foregoing operation.

Having thus described one embodiment of the invention, but without limiting myself thereto, what I claim and desire by Letters Patent to secure is:—

1. In a changeable exhibitor, the combination of a plate carrier having a wall and vertical guides on opposite sides of said wall, oppositely facing plates carried by opposite sides of and having their backs separated by said wall and slidable vertically in said guides parallel with said wall, and a housing into and out of which said plate carrier is slidable in its own plane, said wall dividing said housing into two chambers having opposite openings for the display of the oppositely facing faces of said plates, said housing comprising upper and lower guides distinct from the sides of said housing and presenting grooves which receive upper and lower edges, respectively, of said wall.

2. In a changeable exhibitor, the combination of a plate carrier having a wall and vertical guides on opposite sides of said wall, oppositely facing plates carried by opposite sides of and having their backs separated by said wall and slidable vertically in said guides parallel with said wall, and a housing into and out of which said plate carrier is slidable horizontally in its own plane, said wall dividing said housing into two chambers having opposite openings for the display of the oppositely facing faces of said plates, said housing comprising upper and lower guides distinct from the sides of said housing and presenting grooves which receive upper and lower edges, respectively, of said wall.

3. In a changeable exhibitor, the combination of a plate carrier having a wall and vertical guides on opposite sides of said wall, horizontal plate supporting means on opposite faces of said wall, oppositely facing plates carried by opposite sides of and having their backs separated by said wall, normally resting upon said plate supporting means and slidable vertically in said guides parallel with said wall, and a housing into and out of which said plate carrier is slidable in its own plane, said wall dividing said housing into two chambers having opposite openings for the display of the oppositely facing faces of said plates, said housing comprising upper and lower guides distinct from the sides of said housing and presenting grooves which receive upper and lower edges, respectively, of said wall.

4. In a changeable exhibitor, the combination of a housing having oppositely facing display openings, opposite pairs of guides distinct from the sides of said housing and presenting opposite grooves, a wall having opposite edges received in and guided by said grooves, respectively, and oppositely facing plates carried by opposite faces, respectively, of said wall and displayed through said openings, respectively.

5. In a changeable exhibitor, the combination of a housing having oppositely facing display openings, opposite pairs of angle bars distinct from the sides of said housing and spaced to provide opposite grooves, a wall having opposite edges received in and guided by said grooves, respectively, and oppositely facing plates carried by opposite faces, respectively, of said wall and displayed through said openings, respectively.

6. In a changeable exhibitor, the combination of a housing having oppositely facing display openings, upper and lower guides distinct from the sides of said housing and a wall having opposite edges guided by said guides, respectively, horizontal members secured to opposite faces, respectively, of said wall adjacent the lower edge of the latter and presenting horizontal channels, at opposite faces, respectively, of said wall, and oppositely facing plates having their lower edges, respectively, resting in said channels, and displayed through said openings, respectively.

7. In a changeable exhibitor, the combination of a housing having oppositely facing display openings, transparent plates covering said openings, respectively, within said housing, opposite pairs of bars presenting opposite pairs of rabbets which receive opposite pairs of edges of said plates, opposite guides between said pairs of bars, a carrier having opposite edges received in and guided by said guides, and oppositely facing plates carried by said carrier and displayed through said openings, respectively.

CLARK F. HIGGINS.